Figure 1:
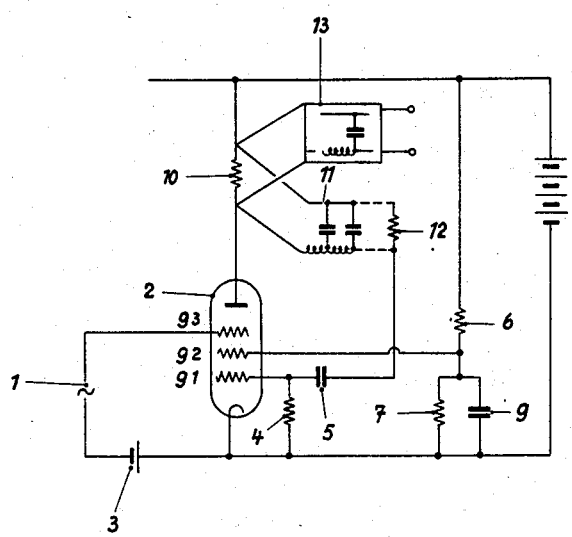

July 6, 1954

R. URTEL 2,683,215

ANGULARLY MODULATED WAVE DEMODULATOR

Filed March 17, 1951.

3 Sheets-Sheet 1

INVENTOR
RUDOLF URTEL
BY Philip M. Bolton
ATTORNEY

INVENTOR
RUDOLF URTEL
BY Philip M. Bolton
ATTORNEY

INVENTOR
RUDOLF URTEL
BY Philip M. Bolton
ATTORNEY

Patented July 6, 1954

2,683,215

UNITED STATES PATENT OFFICE 2,683,215

ANGULARLY MODULATED WAVE DEMODULATOR

Rüdolf Urtel, Pforzheim, Germany, assignor to International Standard Electric Corporation, New York, N. Y., a corporation of Delaware Application March 17, 1951, Serial No. 216,119

Claims priority, application Germany March 18, 1950

4 Claims. (Cl. 250—27)

This invention relates to an angularly modulated wave demodulator of the type in which the angularly modulated wave is translated into modulated pulses from which an amplitude modulated wave is derived.

Conventional demodulators for angularly modulated waves have suffered from a number of difficulties. These difficulties arise with respect to the requirement for an output that varies linearly proportional to the angular deviation of the signal. In general these demodulators have provided linear operation only over relatively limited ranges of angular deviation, and have entailed critical adjustments involving bridge arrangements. The foregoing applies for example to the so-called discriminator in which frequency modulated signals are applied to tuned circuits to produce the relative phase displacement of two voltages, which voltages are added to produce an amplitude modulated signal. The foregoing remarks also apply to the so-called "phi" detector wherein the frequency-dependent phase displacement of two voltages is utilized to obtain pulse width modulation, from which an amplitude modulated signal is readily derived.

Another type of demodulator is based on the device that the output of a self-excited oscillator is locked to the signal being demodulated. As the relative phases are bound to change with frequency deviations of the locking and the locked voltages, the new phase balance of the oscillator is accompanied by a new voltage balance and thus by a change in the average current, and the variations in the latter contain the message.

There is further known a certain method (U. S. Patent No. 2,426,030 issued August 19, 1947, to E. Labin) which amounts to establishing the momentary frequency by a regular counting procedure. Each complete period triggers a pulse of constant amplitude and duration. The train of identical pulses modulated in their repetition frequency includes the information as a low-frequency component which can be filtered out by a straight low-pass filter. Such action is inherently also present in the aforenamed phi detector, but its amplitude is so low with respect to the effect of width modulation that it can be neglected. With this known method, a blocking oscillator capable of pulse-type self-oscillation, is locked by the signal undergoing demodulation, this preferably at an intermediate frequency. For a number of incidental reasons (image rejection, propagation time distortion, etc.), this intermediate frequency cannot be chosen arbitrarily low, so one faces the difficulty of designing an oscillator giving pulse widths short enough (of the order of $10^{-7}$ sec.).

The method mentioned immediately above eliminates the circuitry that goes with bridge circuits, and their related problems. The amplitude vs. frequency characteristics of such bridge circuits show the required linear dependence only to a first approximation, thereby requiring careful adjustment and corresponding testing expenses, while the demodulator in accordance with said method operates in a strictly linear manner. With said method, this merit is opposed by two extra difficulties: the first is the difficulty of making a generator giving adequately short pulse widths (of the order of $10^{-7}$ sec.), and the second is the low output swing around the average value which is not more than $\Delta f/f$, with $\Delta f$ and $f$ referring to frequency swing and carrier frequency respectively. With a carrier of 10 mc., a deviation of 75 kc. thus gives a variation in the average plate current as low as $7.5.10^{-3}$.

An object of the present invention is the provision of a demodulator providing linear operation over relatively large angular deviations. One feature of the invention is the elimination of discriminator bridges with their requirements for critical adjustments. In the present invention short pulses are derived from the angularly modulated wave which pulses are modulated with respect to their repetition rate. In accordance with a feature of the present invention, pulses are directly derived from the angularly modulated wave and after a given delay are used to cut short subsequent pulses derived from said angularly modulated wave.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 is a schematic diagram of a demodulator, Figs. 2, 3a, 3b, 3c, 4, 5a and 5b and 6 are sets of curves used in describing the operation of the system of Fig. 1.

Referring now to Fig. 1, an angularly modulated wave from a source 1 is applied to the third grid $g3$ of a pentode 2. The first and second grids $g1$ and $g2$ are arranged to provide a saturated current condition which is similar to a saturated-cathode condition, at the grid $g3$, which latter is used as a second control grid. The signal undergoing demodulation is applied to grid $g3$, with preferably the zero cross-over point placed at cut-off of the plate current vs. grid ($g3$) potential characteristic. For this purpose a suitable biasing means may be provided, such as for example battery 3. The plate current is prevented from exceeding a given value $i_s$ (Fig. 2) which is determined by the Mu of grids $g1$ and $g2$. The bias of grid $g1$ is controlled by a grid leak resistor 4 and grid condenser 5, while that of grid $g2$ is controlled by a voltage divider consisting of series resistors 6 and 7 connected across the anode voltage supply source 8, with by-pass condenser 9 shunted across resistor 7.

The leading edge of the plate current pulse which results when the signal goes positive causes a dip in the plate voltage across the plate circuit resistor 10. This voltage is fed into a delay line 11, such as for example a transmission line, or a simulated transmission line, which is terminated in a matching impedance 12 to prevent reflection. After a delay due to the propagation time $t_0$ along the delay line, the negative-going voltage is applied to grid $g1$ to cut off the plate current. The interrupted plate current thus takes the form of pulses. As will be explained hereafter in connection with the figures containing the curves, the width of the pulses is controlled by the delay time, and the repetition rate will change with angular deviations in the signal wave. The delay time is critical and critical ranges for this delay time will be pointed out hereinafter. Within these critical ranges the plate current pulses are of constant energy content (constant amplitude and constant width) and their repetition rate varies linearly with the angular deviations in the signal wave. By applying these variable repetition rate pulses to a suitable integrating device, such as low pass filter 13, an amplitude modulated wave is derived which varies linearly with the angular modulation of the input wave.

Figure 2:
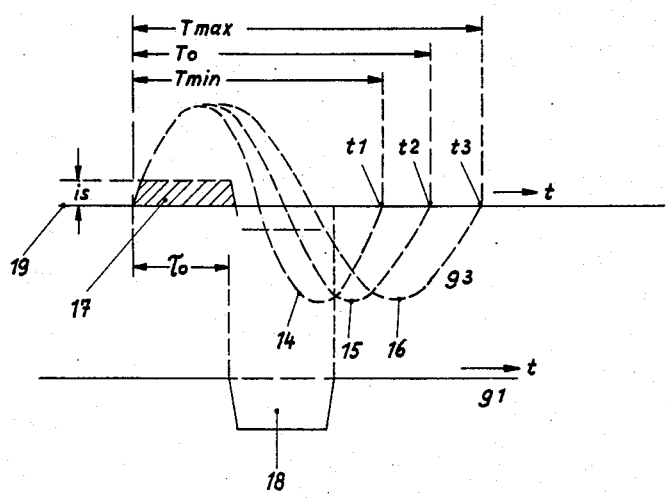
Figure 3A:
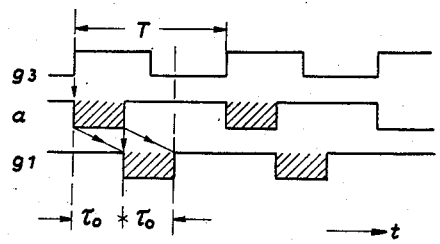
Figure 3B:
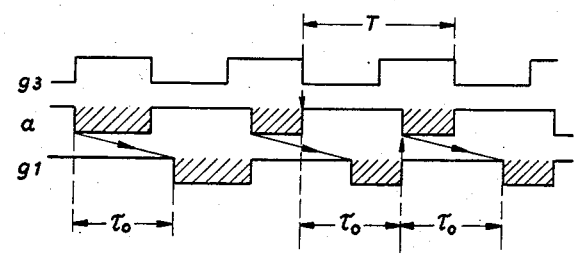
Figure 3C:
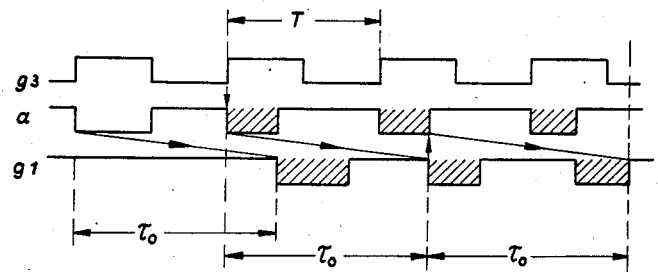

The foregoing operation is illustrated in Fig. 2. The range of angular deviation of a given angularly modulated wave is illustrated in Fig. 2 by three single cycles 14, 15 and 16, of which cycle 15 representing the mean frequency has a period $T_0$, cycle 14 representing the highest frequency has a period $T_{min}$, and cycle 16 representing the lowest frequency has a period $T_{max}$. Considering the effects of these cycles when applied to grid $g3$ it will be seen that during the positive portion of each cycle current will start to flow in the anode circuit and the voltage produced across the resistor 10 will be fed back after a delay $t_0$ to cut off this voltage flow so that the current flow through resistor 10 is in the form of pulses such as pulse 17, these pulses having a constant amplitude $i_s$. In the example of Fig. 2 the delay time $t_0$ is greater than a quarter of the period of each of the cycles and less than half the period of each of the cycles. At the output of the delay line 12 a negative going voltage pulse 18 is produced which is a mirror image of the current pulse 17. At the end of pulse 18 anode current would start to flow again except that the voltage applied to $g3$ is at that time below the cross-over level which is designated by the numeral 19. It will be apparent that the repetition frequency of pulses 17 is determined by the frequency of the wave applied to $g3$. This can be seen from the fact that anode current will next flow when the voltage applied to $g3$ becomes positive. For the highest frequency signal this will occur earliest at time $t_1$, for the middle frequency signal this will occur at time $t_2$, and for the low frequency signal it will occur last at time $t_3$.

Fig. 3–A once more illustrates the operating conditions of the arrangement of Fig. 1. Again $g3$ refers to the external signal voltage (shown for clarity here as a square wave but actually a sine wave), $a$ is the plate potential wave, and $g1$ is the voltage wave at the first control grid ($g1$) which is identical with $a$ except that it is displaced in time by the propagation or delay time $t_0$. The rise of $g3$ causes a falling edge of $a$, and the latter, delayed by $t_0$ at $g1$, causes a rising edge at $a$. This edge delayed by $t_0$ at $g1$, fails to affect $a$ in any way, as $g3$ has returned meanwhile to its former value thus cutting the plate current.

The overall duration of the plate potential pulses under one period of the input voltage thus is $t_0$, so with a saturated value $i_s$ of the plate current, its average value is $$i_0 = i_s \cdot t_0 / T = i_s \cdot f \cdot t_1$$

(with $f = 1/T$ being the input frequency). The average value thus is strictly proportional to frequency. The so far described action of the circuit occurs when the semi-period of the input signal exceeds the delay time but remains less than twice that value. This range of delay time will be termed hereinafter the basic range of first order.

One realizes however that even with larger pulse widths and delay times the desired linearity between the average current and frequency is retained. The Figs. 3–B and 3–C show two such cases with the first upper range of first order (Fig. 3–B) generated by delay times or between 0.5 and 0.75 periods, while the second upper range of first order (Fig. 3–C) is reached for delays between 1.25 and 1.5 times the period.

Figure 4:
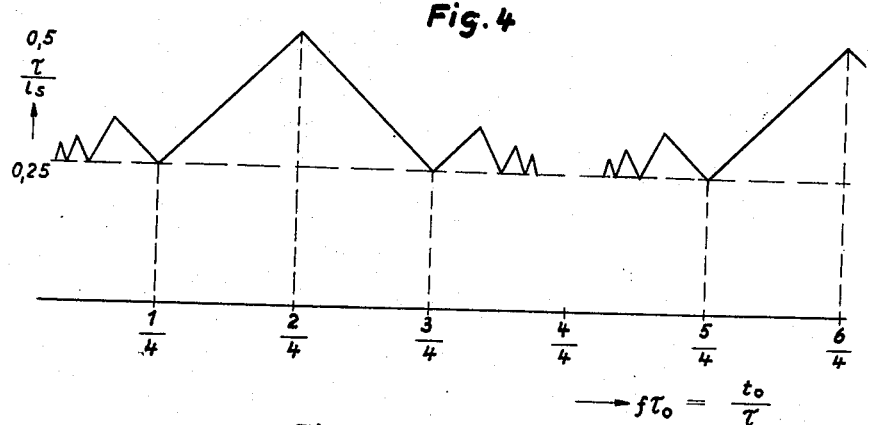

Fig. 4 gives a combined picture of the location of the critical ranges of the delay time and the dependence of the average current on frequency. In Fig. 4 there is plotted along the abscissa the ratio of the delay time to the period of a single cycle:

$$\frac{t_0}{T}$$

It will be obvious that $$\frac{t_0}{T}$$

is equal to $ft_0$, that is, the product of the frequency times the delay time. With respect to the ordinate which represents the average current, it is to be remembered that the anode current is of constant amplitude and that the width of the anode pulses is controlled by the delay time. With varying widths the proportion of the total time during which current flows will give the average current. Therefore along the ordinate, .25 signifies that current is flowing a quarter of the total time and .5 represents current flowing half the total time. From the foregoing it will be quite evident that these figures are proportional to the average current flow.

Examining Fig. 4 it will be seen that for delay ratios $$\left(\frac{t_0}{T} \text{ or } ft_0\right)$$

from 1/4 to 2/4 there is a linear change in the proportion of time during which current flows, from .25 to .5. This provides for a very large frequency variation with linear output. Likewise from 2/4 to 3/4, from 5/4 to 6/4, and 6/4 to 7/4

(not shown) similar wide ranges are found providing linear deviation. Additional such ranges will be found by adding an additional 4/4 to each of the ranges herein mentioned or multiples of said 4/4. However, due to the distortion of the delay line there is a practical limit as to how high a range may be employed.

Between the critical ranges hereinabove mentioned there exists relatively narrow ranges not satisfactory for wide deviation with linear output. It will be seen that under 1/4 delay ratio, and between 3/4 and 5/4 delay ratio, a plurality of secondary ranges appear which are quite narrow insofar as they produce linear operation.

Figure 5A:
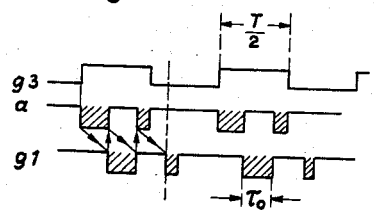
Figure 5B:
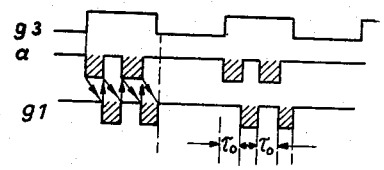
Figure 6:
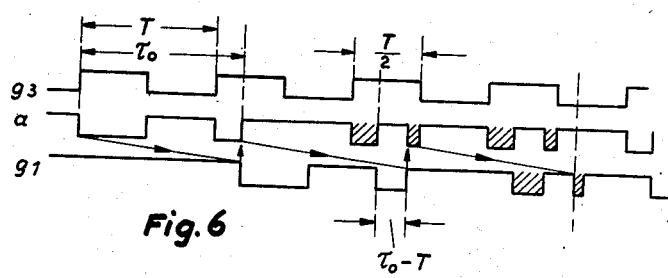

These ranges occur because any edge started by a zero cross-over is capable of running a number of times through the circuit loop formed by the delay network of the tube before it reaches the third grid under a blocked condition so that it is suppressed thereby. The performance in these narrow ranges is indicated in Figs. 5A, 5B and 6. In Fig. 5A the delay time is less than ¼ and more than ⅛. In Fig. 5B it is less than ⅛. In Fig. 6 it is between 1⅛ and 1¼.

It is interesting to note that a given current deviation as shown in Fig. 4 is always related to a certain frequency deviation no matter what the carrier frequency. This means that unlike the methods described in the introduction the current deviation now increases with the carrier frequency $f$ for a given value of $\Delta f/f$. One can describe this circuit action even by the explanation that delay over more than one carrier period of the leading pulse edge caused by a zero crossover and its use as a trailing edge of a pulse generated by some later zero cross-over allows the incremental pulse durations or delays to be integrated over several periods, rather than those of an individual period.

The previous figures showed the action of the arrangement with the pulses derived from the zero cross-over, hence with a current flow angle at the third grid ($g3$) of 180°. Deviations from this current flow angle will reduce the width of the controlling ranges in any case. Moreover, at very large angles of current flow there are possible ranges of mixed order where two independent pulse edges pass the delay network a different number of times.

One realizes from Fig. 4 that the first order or critical ranges are driven to full output, if $t_0 \cdot \Delta f = \frac{1}{4}$, no matter what the carrier frequency. With television transmission with $\Delta f = 5$ mc., there would result $t_0 = 0.5 \cdot 10^{-7}$ sec. With a carrier of 30 mc. one would thus be operating in the second upper range, so the rise time of the edge would be around not more than $10^{-8}$ sec. These however are figures which can be realized in actual practice.

While I have described above the principles of my invention in connection with specific apparatus, it is to be clearly understood that this description is made only by way of example and not as a limitation to the scope of my invention.

I claim:

1. A demodulator for an angularly modulated alternating current signal wave comprising an electron tube having a plurality of control elements, means for directly applying said angularly modulated signal wave to a first one of said control elements, means for biasing said tube to cut-off below a given level of said signal wave and to conduct upon said signal wave exceeding said level, means immediately responsive to the conduction of said tube for producing an initial voltage of inverse polarity with respect to the applied voltage, and feed-back means for applying vectorially said initial voltage of said inverse polarity to a second one of said control elements to cut-off conduction of said tube, said feedback means including a delay device serially connected between the output of said tube and said second control element.

2. A demodulator according to claim 1 wherein said electron tube includes an anode, cathode and a plurality of control grids each being one of said control elements, said signal wave being applied to a grid near the anode, said delayed voltage being applied to a grid nearer the cathode, and additional biasing means biasing the grids between the signal-applied grid and the cathode to provide a saturated current condition at said signal-applied grid.

3. A demodulator according to claim 1 wherein said means for biasing said tube to cut-off has a biasing value to cut off conduction upon the signal wave being lower than its zero cross-over value.

4. A demodulator according to claim 1 further including a low pass filter at the output of said tube for converting the pulses produced by said tube into a continuous wave.

References Cited in the file of this patent

UNITED STATES PATENTS

| Number | Name | Date |
| --- | --- | --- |
| 2,441,957 | Rosa | May 25, 1948 |
| 2,448,526 | Gross | Sept. 7, 1948 |
| 2,484,556 | Custin | Oct. 11, 1949 |